US012347594B2

(12) United States Patent
Seino et al.

(10) Patent No.: US 12,347,594 B2
(45) Date of Patent: Jul. 1, 2025

(54) MAGNETIC COMPOSITE BODY, COIL COMPONENT INCLUDING MAGNETIC COMPOSITE BODY, AND METHOD OF MANUFACTURING MAGNETIC COMPOSITE BODY

(71) Applicant: TAIYO YUDEN CO., LTD., Tokyo (JP)

(72) Inventors: Hirotaro Seino, Tokyo (JP); Kengo Tsuchiya, Tokyo (JP); Masahiro Hachiya, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 289 days.

(21) Appl. No.: 18/090,148

(22) Filed: Dec. 28, 2022

(65) Prior Publication Data

US 2023/0274867 A1 Aug. 31, 2023

(30) Foreign Application Priority Data

Feb. 28, 2022 (JP) ................................ 2022-030267

(51) Int. Cl.
*H01F 1/33* (2006.01)
*H01F 1/147* (2006.01)
*H01F 1/26* (2006.01)
*H01F 17/04* (2006.01)
*H01F 41/02* (2006.01)

(52) U.S. Cl.
CPC ............... *H01F 1/33* (2013.01); *H01F 1/147* (2013.01); *H01F 1/26* (2013.01); *H01F 17/04* (2013.01); *H01F 41/0246* (2013.01); *H01F 2017/048* (2013.01)

(58) Field of Classification Search
CPC ... H01F 1/33; H01F 1/26; H01F 17/04; H01F 201/048
USPC .......................................................... 428/470
See application file for complete search history.

(56) References Cited

U.S. PATENT DOCUMENTS

2010/0060538 A1* 3/2010 Suetsuna .................. H01Q 9/16 427/576
2016/0125987 A1 5/2016 Moon et al.
2020/0051720 A1* 2/2020 Li ....................... H01F 41/0246

FOREIGN PATENT DOCUMENTS

JP 2016-092403 A 5/2016
JP 2020-170823 A 10/2020

* cited by examiner

*Primary Examiner* — Katherine A Christy
(74) *Attorney, Agent, or Firm* — Pillsbury Winthrop Shaw Pittman, LLP

(57) ABSTRACT

A magnetic composite body contains a first metal magnetic particle and a second metal magnetic particle, and fine particles are in contact with the first and second metal magnetic particles. The fine particles are insulating and non-magnetic particles. A first oxide film is provided on the surface of the first metal magnetic particle, and a second oxide film is provided on the surface of the second metal magnetic particle. The fine particles may be provided on a surface of the first metal magnetic particles and separated from each other. The fine particles are insulating and non-magnetic and may include first fine particles. Optionally, first and second fine particles, or hydrophobically treated SiO2 particles, may be provided.

16 Claims, 8 Drawing Sheets

MAGNETIC COMPOSITE BODY, COIL COMPONENT INCLUDING MAGNETIC COMPOSITE BODY, AND METHOD OF MANUFACTURING MAGNETIC COMPOSITE BODY

CROSS-REFERENCE TO RELATED APPLICATIONS

This application is based on and claims the benefit of priority from Japanese Patent Application Serial No. 2022-030267 (filed on Feb. 28, 2022), the contents of which are hereby incorporated by reference in its entirety.

TECHNICAL FIELD

The present disclosure relates to a magnetic composite body containing metal magnetic particles and a coil component including such a magnetic composite body. The present disclosure also relates to a method of manufacturing the magnetic composite body.

BACKGROUND

Coil components are installed in various electronic devices. For example, coil components are used to eliminate noise in power source lines or signal lines in circuits. A common coil component includes a magnetic base body and a coil conductor provided in the magnetic base body. In recent years, soft magnetic base bodies containing a large number of metal magnetic particles constituted by a soft magnetic material are used as magnetic base bodies of coil components. In the soft magnetic base bodies, the metal magnetic particles are bonded to each other via insulating films. Since the soft magnetic base bodies are less prone to cause magnetic saturation than magnetic base bodies made of ferrite, the soft magnetic base bodies are suitable for large-current circuits.

The soft magnetic base bodies, on the other hand, are likely to experience dielectric breakdown at the insulating films covering the surface of the metal magnetic particles. For this reason, the soft magnetic base bodies are inferior to ferrite magnetic base bodies from the perspective of withstand voltage characteristics. To improve the withstand voltage characteristics, it has been proposed to use, as magnetic base bodies, magnetic composite bodies where insulating fine particles surround metal magnetic particles. For example, Japanese Patent Application Publication No. 2020-170823 ("the '823 Publication") describes coated particles including metal magnetic particles, insulating fine particles fixedly attached to the surface of the metal magnetic particles, and an insulating film covering the surface of the insulating fine particles. According to the '823 Publication, the coated particles are mixed with a resin to produce a resin composition, and the resin composition is shaped into a magnetic base body. In addition, Japanese Patent Application Publication No. 2016-92403 ("the '403 Publication") discloses a magnetic composite body including metal magnetic particles coated with an insulating film, a resin, and insulating fine particles dispersed within the resin.

In conventional magnetic composite bodies containing insulating fine particles, the filling factor of the metal magnetic particles is low because the insulating fine particles and insulating films are interposed between adjacent ones of the metal magnetic particles. When the insulating films are made of a non-magnetic material, the low filling factor of the metal magnetic particles may result in lower magnetic permeability of the magnetic composite bodies. The insulating film disclosed in the '823 Publication (inorganic insulating layer 30) is composed of, for example, tetraethoxysilane (TEOS), and the insulating film disclosed in the '403 Publication (insulating layer 120) is composed of, for example, a polymer resin such as epoxy. Since TEOS and epoxy are both non-magnetic materials, the magnetic permeability of the magnetic composite bodies may drop if the insulating films disclosed in the '823 and '403 Publications are employed to surround the metal magnetic particles.

The insulating film formed on the surface of the metal magnetic particles may be made of an oxide of the elements contained in the metal magnetic particles. For example, the '403 Publication discloses that the insulating layer 120 may be composed of oxides of the metal magnetic particles (Fe—Si—Cr-, Fe—Ni—Mo- or Fe—Si—Al-based soft magnetic metal powder). Since some of the oxides of the elements contained in the metal magnetic particles are ferromagnetic materials, magnetic composite bodies containing metal magnetic particles covered with oxide films often exhibit better magnetic permeability than magnetic composite bodies containing metal magnetic particles covered with non-magnetic coating films.

The oxide films on the surface of the metal magnetic particles, however, do not necessarily have a uniform thickness as the thickness of the oxide films is affected by the surrounding environmental conditions around the respective particles. The oxidization cannot be performed under uniform conditions (in terms of, for example, oxygen concentration and heating temperature) across the entire region of the magnetic composite bodies. In other words, the oxide films formed on the surface of the respective metal magnetic particles will have different thicknesses. Therefore, in magnetic base bodies containing metal magnetic particles covered with oxide films, the spacing between adjacent ones of the metal magnetic particles varies significantly, as a result of which local magnetic saturation is likely to occur in magnetic paths where only a small spacing is provided between adjacent ones of the metal magnetic particles. Such local magnetic saturation may disadvantageously hinder success in increasing the rated current in conventional magnetic composite bodies. In other words, conventional magnetic composite bodies may not achieve excellent magnetic saturation characteristics.

SUMMARY

An object of the present invention is to solve or relieve at least a part of the above problem. More specifically, one of the objects of the present invention is to provide magnetic composite bodies containing metal magnetic particles and insulating fine particles with improved magnetic saturation characteristics.

A magnetic composite body according to one embodiment of the present invention includes a plurality of metal magnetic particles including a first metal magnetic particle and a second metal magnetic particle adjacent to the first metal magnetic particle; first fine particles in contact with the first and second metal magnetic particles, where the first fine particles are insulating and non-magnetic; an insulating first oxide film on a surface of the first metal magnetic particle, where the first oxide film contains an oxide of an element constituting the first metal magnetic particle; and an insulating second oxide film on a surface of the second metal magnetic particle, the second oxide film containing an oxide of an element constituting the second metal magnetic particle.

One aspect of the present invention relates to a circuit board including a coil component including the above magnetic composite body and a coil conductor.

One aspect of the invention relates to an electronic device including the above circuit board.

A method of manufacturing a magnetic composite body relating to one embodiment of the present invention includes the following steps of mixing a soft magnetic metal powder and an insulating and non-magnetic fine-particle powder, so that a powder mixture is obtained; mixing the powder mixture with a resin, so that a resin mixture composition is obtained; compressing the resin mixture composition, so that a compressed molded body is obtained, at least one of particles of the fine-particle powder being arranged between adjacent particles of the soft magnetic metal powder; and heating the compressed molded body, so that the resin is degreased and an oxide film is formed on a surface of each particle of the soft magnetic metal powder.

Advantageous Effects

Magnetic composite bodies containing metal magnetic particles and insulating fine particles according to one or more embodiments of the present invention can achieve improved magnetic saturation characteristics.

DESCRIPTION OF THE PREFERRED EMBODIMENTS

Figure 1:
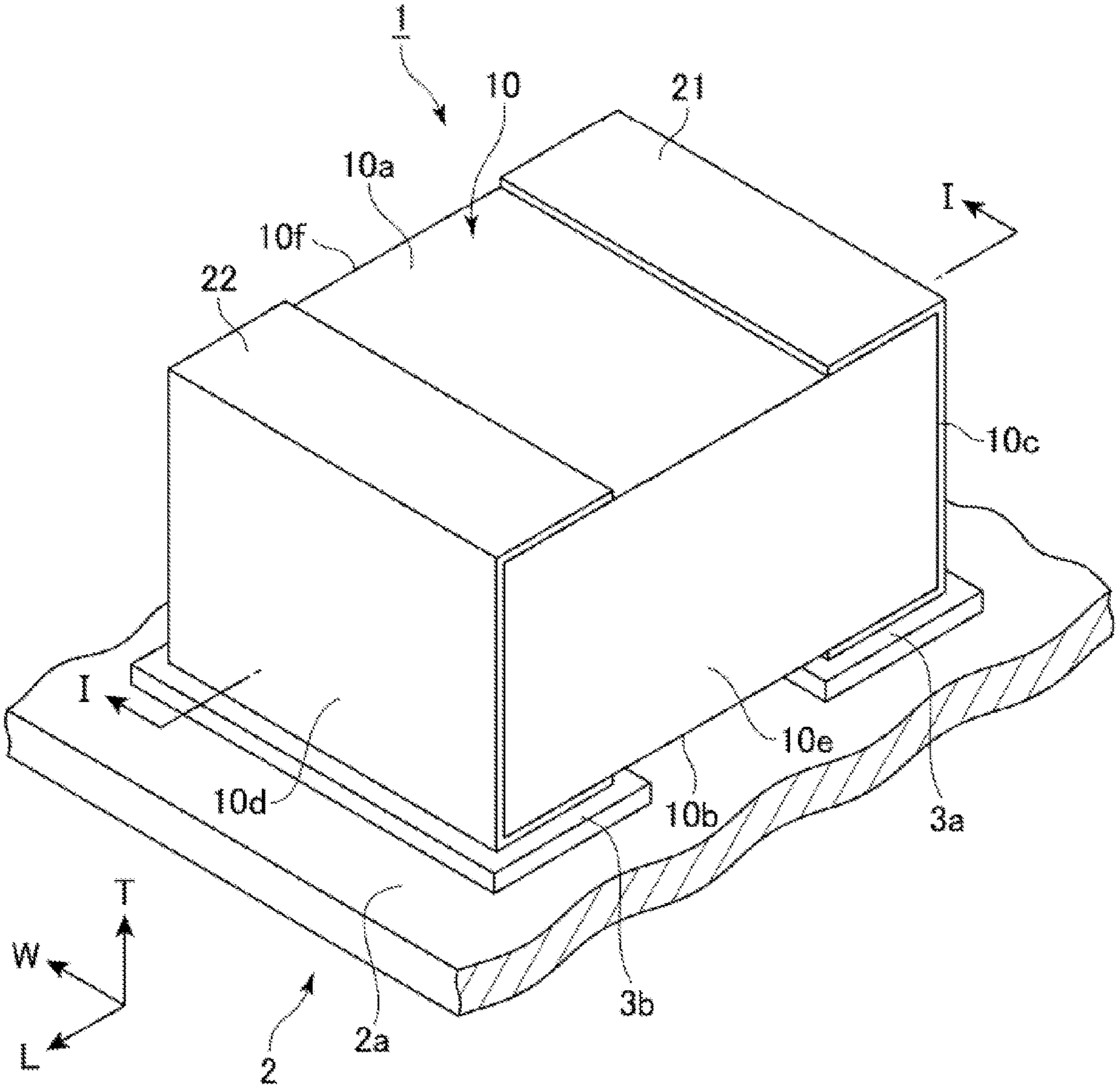
FIG. 1 is a schematic perspective view showing a coil component including a magnetic composite body according to one embodiment of the present invention.

Various embodiments of the present invention will be described hereinafter with reference to the appended drawings. Throughout the drawings, the same components are denoted by the same reference numerals. It should be noted that the drawings do not necessarily appear in accurate scales for convenience of description. The following embodiments of the present invention do not limit the scope of the claims. The elements described in the following embodiments are not necessarily essential to solve the problem addressed by the invention.

One embodiment of the invention disclosed herein relates to a magnetic composite body including a large number of metal magnetic particles and a large number of insulating and non-magnetic fine particles. The magnetic composite body can be used as a magnetic base body of a coil component. Oxide films are provided on the surface of the metal magnetic particles. Via the oxide films, adjacent ones of the metal magnetic particles contained in the magnetic composite body are bonded. The following first describes a coil component 1 including a magnetic composite body relating to one embodiment with reference to FIGS. 1 to 3, and then the microstructure of the magnetic composite body with reference to FIGS. 4 to 6.

Figure 2:
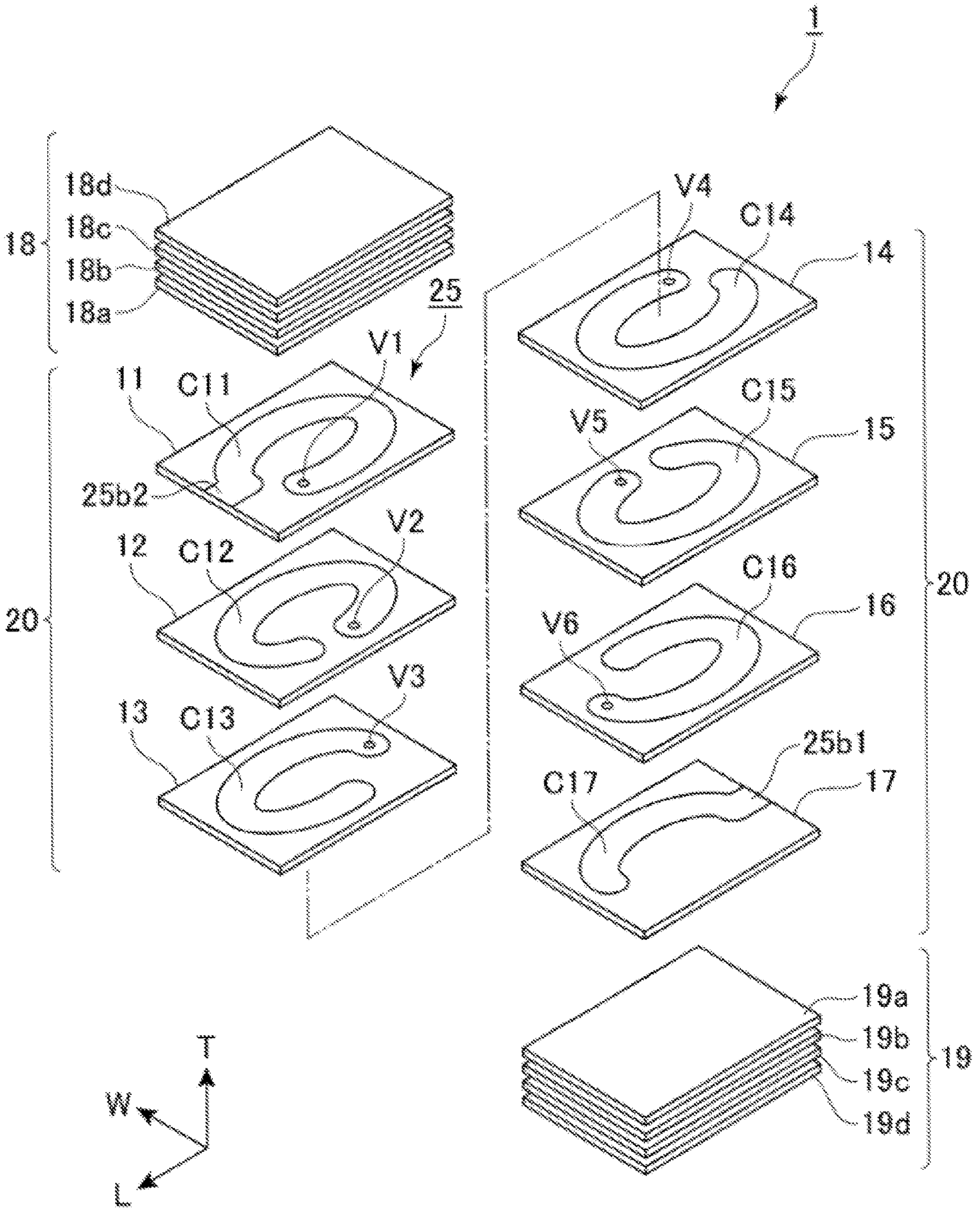
FIG. 2 is an exploded perspective view of the coil component shown in FIG. 1.
Figure 3:
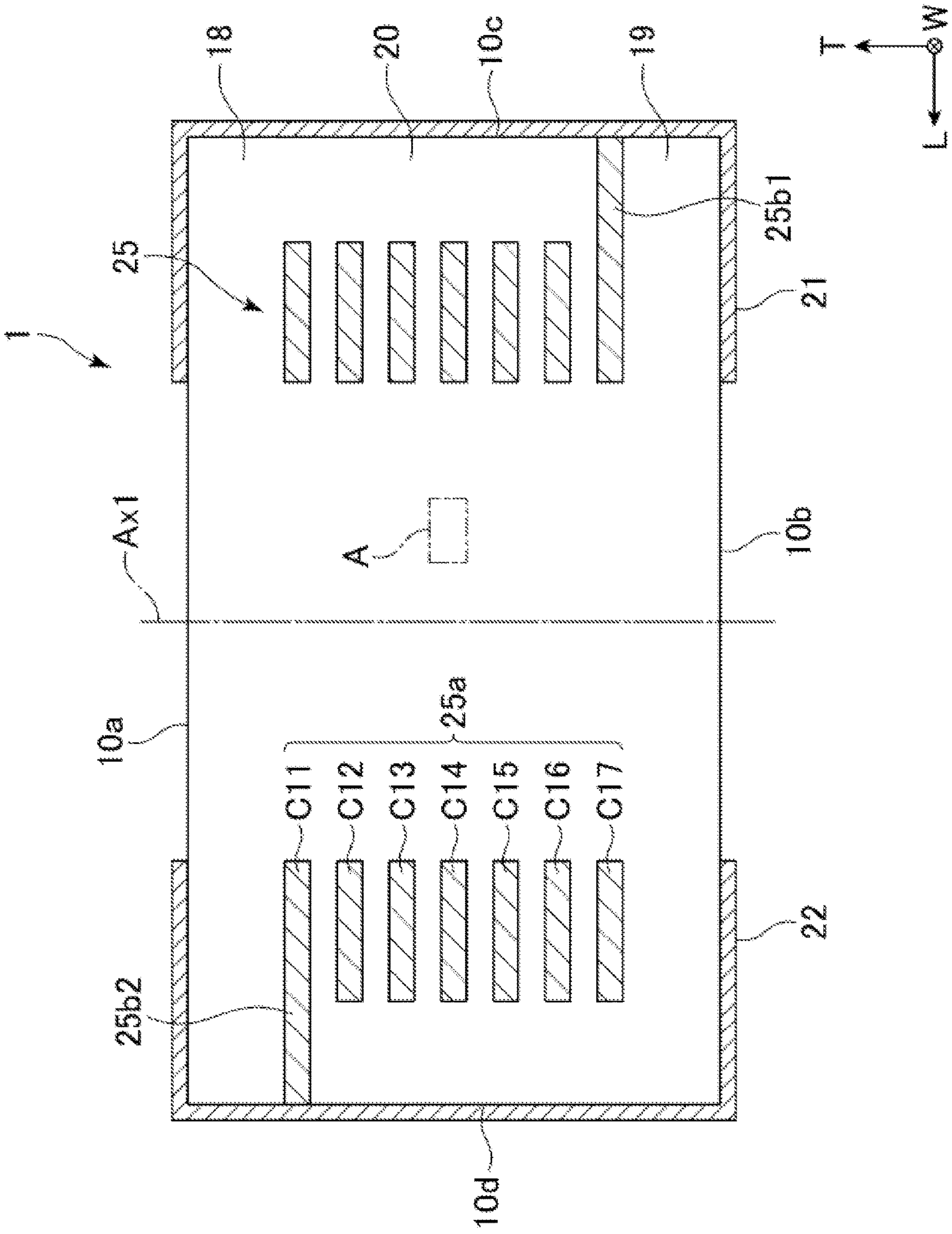
FIG. 3 is a sectional view schematically showing a section of the coil component of FIG. 1 along the line I-I.

FIG. 1 is a schematic perspective view of the coil component 1, and FIG. 2 is an exploded perspective view of the coil component 1. FIG. 3 is a schematic sectional view of the coil component 1 along the line I-I of FIG. 1. In FIGS. 2 and 3, external electrodes are not shown for convenience of description.

By way of one example of the coil component 1, FIGS. 1 to 3 show a laminated inductor. The laminated inductor shown is an example of the coil component 1 to which the invention can be applied. The invention can also be applied to various coil components other than the laminated inductor. For example, the coil component 1 may be applied to wire-wound coil components or planar coils.

As shown in the drawings, the coil component 1 includes a base body 10, a coil conductor 25 provided in the base body 10, an external electrode 21 disposed on a surface of the base body 10, and an external electrode 22 disposed on the surface of the base body 10 at a position spaced apart from the external electrode 21. The base body 10 is a magnetic base body. The base body 10 is an example of the feature "magnetic composite body recited in the claims. As will be described below, the base body 10 contains a large number of metal magnetic particles and insulating and non-magnetic fine particles.

The external electrode 21 is electrically connected to one end of the coil conductor 25, and the external electrode 22 is electrically connected to the other end of the coil conductor 25.

The coil component 1 may be mounted on a mounting substrate 2*a*. The mounting substrate 2*a* has lands 3*a* and 3*b* provided thereon. The coil component 1 is mounted on the mounting substrate 2*a* by bonding the external electrode 21 to the land 3*a* and bonding the external electrode 22 to the land 3*b*. A circuit board 2 according to one embodiment of the present invention includes the coil component 1 and the mounting substrate 2*a* having the coil component 1 mounted thereon. The circuit board 2 can be mounted in various electronic devices. The electronic devices in which the circuit board 2 can be installed include smartphones, tablets, game consoles, electrical components of automobiles, servers, and various other electronic devices.

The coil component 1 may be an inductor, a transformer, a filter, a reactor, an inductor array and any one of various other coil components. The coil component 1 may alternatively be a coupled inductor, a choke coil, and any one of various other magnetically coupled coil components. Applications of the coil component 1 are not limited to those explicitly described herein.

In one embodiment of the present invention, the base body 10 is configured such that the dimension in the L-axis direction (length dimension) is greater than the dimension in the W-axis direction (width dimension) and the dimension in the T-axis direction (height dimension). For example, the length dimension is from 1.0 mm and 6.0 mm, the width dimension is from 0.5 mm to 4.5 mm, and the height dimension is from 0.5 mm to 4.5 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the length direction of the base body 10, and the first side surface 10*e* and the second side surface 10*f* are at the opposite ends in the width direction of the base body 10. As shown in FIG. 1, the first principal surface 10*a* is at the top of the base body 10, and therefore, the first principal surface 10*a* may be referred to as a "top surface." Likewise, the second principal surface 10*b* may be referred to as a "lower surface" or "bottom surface." Since the coil component 1 is disposed such that the second principal surface 10*b* faces the mounting substrate 2*a*, the second principal surface 10*b* may be herein referred to as "the mounting surface." The top surface 10*a* and the bottom surface 10*b* are separated from each other by a distance equal to the height of the base body 10, the first end surface 10*c* and the second end surface 10*d* are separated from each other by a distance equal to the length of the base body 10, and the first side surface 10*e* and the second side surface 10*f* are separated from each other by a distance equal to the width of the base body 10.

As shown in FIG. 2, the base body 10 includes a magnetic layer 20, a top cover layer 18 provided on the top-side surface of the magnetic layer 20, and a bottom cover layer 19 provided on the bottom-side surface of the magnetic layer 20. The top cover layer 18, bottom cover layer 19, and magnetic layer 20 are the components of the base body 10.

The magnetic layer 20 includes magnetic films 11 to 17. In the magnetic layer 20, the magnetic films 17, 16, 15, 14, 13, 12 and 11 are stacked in the stated order from the negative side to the positive side in the T direction.

The magnetic films 11 to 17 respectively have conductor patterns C11 to C17 formed on the top-side surface thereof. The conductor patterns C11 to C17 each extend around a coil axis Ax1 within a plane orthogonal to the coil axis Ax1 (the LW plane). The conductor patterns C11 to C17 are formed by, for example, printing a conductive paste made of a highly conductive metal or alloy via screen printing. The conductive paste may be made of Ag, Pd, Cu, Al, or alloys thereof. The conductor patterns C11 to C17 may be formed using other methods and materials. For example, the conductor patterns C11 to C17 may be formed by sputtering, ink-jetting, or other known methods.

The magnetic films 11 to 16 have vias V1 to V6, respectively, at a predetermined position therein. The vias V1 to V6 are formed by forming a through-hole in the magnetic films 11 to 16 at the predetermined position so as to extend through the magnetic films 11 to 16 in the T axis direction and filling the through-hole with a conductive material.

Each of the conductor patterns C11 to C17 is electrically connected to the respective adjacent conductor patterns through the vias V1 to V6. The conductor patterns C11 to C17 and the vias V1 to V6 connected together in this manner form the spiral coil conductor 25. In other words, the coil conductor 25 is constituted by the conductor patterns C11 to C17 and the vias V1 to V6.

The end of the conductor pattern C11 opposite to the end thereof connected to the via V1 is connected to the external electrode 22. The end of the conductor pattern C17 opposite to the end thereof connected to the via V6 is connected to the external electrode 21.

The top cover layer 18 includes magnetic films 18*a* to 18*d* made of a magnetic material, and the bottom cover layer 19 includes magnetic films 19*a* to 19*d* made of a magnetic material. In this specification of the present invention, the magnetic films 18*a* to 18*d* and the magnetic films 19*a* to 19*d* may be referred to collectively as "the cover layer magnetic films."

As shown in FIG. 3, the coil conductor 25 includes a winding portion 25*a* wound around the coil axis Ax1 extending along the thickness direction (T-axis direction), a lead-out portion 25*b*1 extending from one end of the winding portion 25*a* to the first end surface 10*c* of the base body 10, and a lead-out portion 25*b*2 extending from the other end of the winding portion 25*a* to the second end surface 10*d* of the base body 10.

Figure 4:
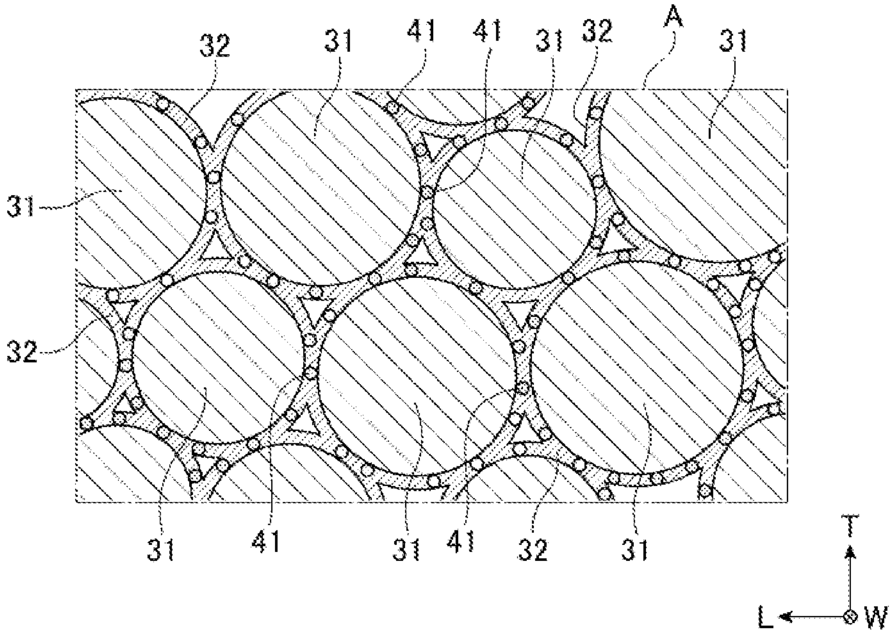
FIG. 4 is an enlarged sectional view of a region A indicated in FIG. 3.
Figure 5:
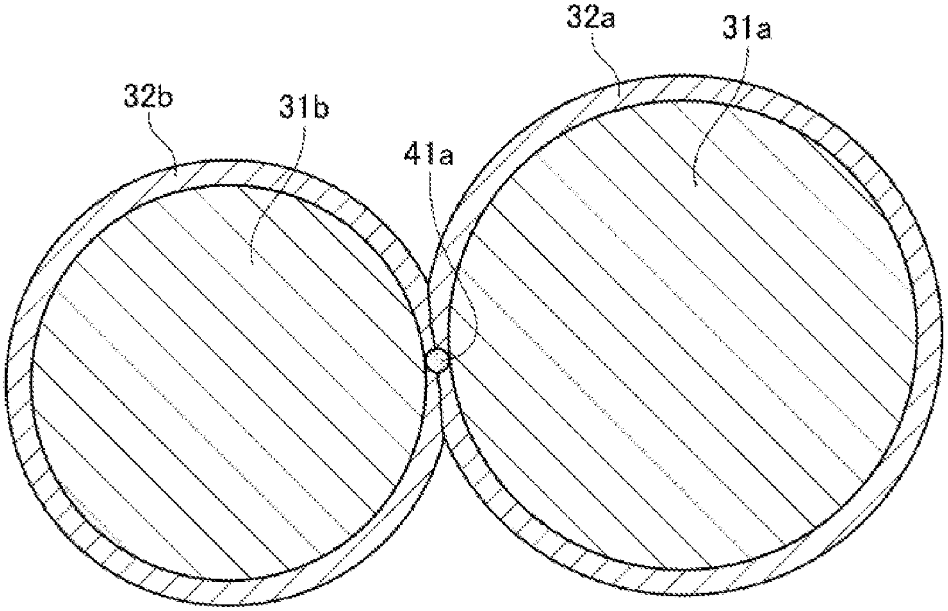
FIG. 5 is a schematic view illustrating how metal magnetic particles are bonded to each other in the magnetic composite body relating to the embodiment.
Figure 6:
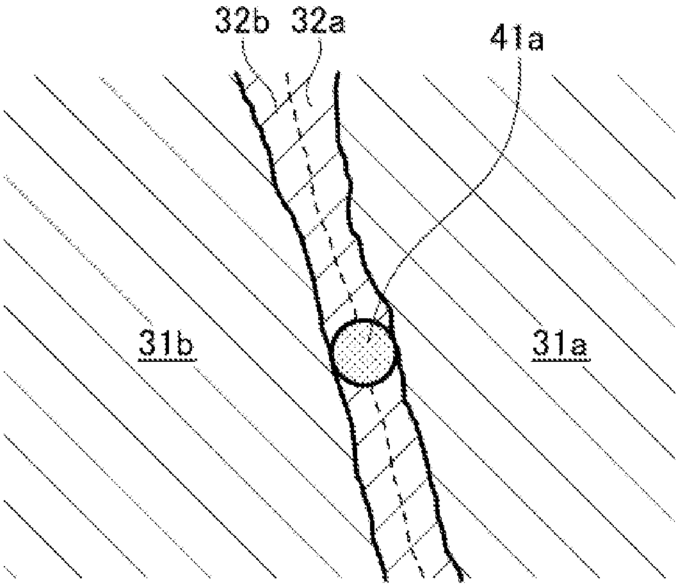
FIG. 6 schematically shows, in an enlarged state, the boundary between adjacent ones of the metal magnetic particles contained in the magnetic composite body relating to the embodiment of the present invention.

The following now describes the microstructure of the base body 10 with reference to FIGS. 4 to 6. FIG. 4 is a schematic enlarged sectional view of a region A indicated in FIG. 3. The region A is a partial region of the section of the base body 10 that is obtained by cutting the base body 10 along the T-axis. The region A may be any region of the section of the base body 10 that is obtained by cutting the base body 10 along the T-axis.

As shown in FIG. 4, the base body 10 contains a plurality of metal magnetic particles 31 having oxide films 32 formed on the surface thereof and a plurality of fine particles 41. The metal magnetic particles 31 and oxide films 32 can be produced by heating a source material, which is a soft magnetic metal powder. The metal magnetic particles 31 may be Fe-based metal magnetic particles constituted by a Fe-based soft magnetic material. The fine particles 41 are produced from a source material, which is a fine-particle powder. The source powder for the fine particles 41 may be a highly thermally stable powder. In this case, even after heated along with the soft magnetic metal powder, the source powder for the fine particles 41 experiences no or little change in composition or particle size. The source powder for the fine particles 41 will be described in detail below.

The average particle size of the metal magnetic particles 31 can be, for example, within the range of 1 μm to 50 μm. The average particle size of the metal magnetic particles 31 is determined in the following manner. The base body 10 is cut along the thickness direction (the T axis direction) to expose a section. The section is photographed using a scanning electron microscope (SEM) to obtain a SEM image, and the volume-weighted particle size distribution is determined based on the SEM image. The particle size distribution is used to determine the average particle size.

For example, the average particle size (the median diameter (D50)) calculated based on the volume-weighted particle size distribution obtained based on the SEM image can be used as the average particle size of the metal magnetic particles 31.

The metal magnetic particles 31 having the oxide films 32 formed on their surface can be obtained by oxidizing the soft magnetic metal powder. The soft magnetic metal powder may be made of a soft magnetic material mainly composed of Fe. In other words, the soft magnetic metal powder may be a Fe-based soft magnetic metal powder made of a Fe-based soft magnetic material. The soft magnetic metal powder may contain, in addition to Fe, at least one element selected from the group consisting of Si, Cr, Zr, Al and Ti. The soft magnetic metal powder may contain other elements than the above-listed elements (i.e., at least one element selected from the group consisting of Fe, Cr, Si, Zr, Al and Ti), for example, at least one element selected from the consisting of, for example, boron (B), carbon (C) and nickel (Ni). The metal magnetic particles 31 may be particles of (1) a crystalline alloy such as an Fe—Si—Cr alloy, an Fe—Si—Al alloy, an Fe—Si—Al—Cr alloy or Fe—Si alloy, (2) an amorphous alloy such as an Fe—Si—B alloy, an Fe—Si—Cr—B—C alloy or an Fe—Si—Cr—B alloy, or (3) a mixture thereof. The composition of the metal magnetic particles 31 is not limited to those described above.

The oxide films 32 are formed on the surface of the metal magnetic particles 31. The adjacent ones of the metal magnetic particles 31 may be bonded to each other via the oxide films 32 on their surface. The oxide films 32 formed on the surface of the metal magnetic particles 31 contain an oxide of at least one element elected from the group consisting of Fe, Cr, Si, Zr, Al, and Ti contained in the metal magnetic particles. When the metal magnetic particles 31 are Fe-based metal magnetic particles, the oxide films 32 contain an oxide of Fe. The oxide films 32 are a highly insulating oxide coating. The oxide films 32 electrically insulate the adjacent ones of the metal magnetic particles 31 from one another. In one embodiment, the oxide films 32 contain a ferromagnetic oxide. The oxide films 32 may contain, for example, an oxide of Fe, specifically magnetite ($Fe_3O_4$). The oxide films 32 may contain a highly insulating oxide. The oxide films 32 may contain one or more of $Fe_2O_3$, $SiO_2$, CrO, and $SiO_2$, for example. The fact that the oxide films 32 contain an oxide of at least one element selected from the group consisting of Fe, Cr, Si, Zr, Al and Ti can be confirmed in the following manner. A transmission electron microscope (TEM) equipped with an energy dispersive X-ray spectroscopy (EDS) detector is used to photograph an exposed section of the base body 10 at an appropriate magnification that is defined such that the observed region is a square of 250 nm (e.g., about 50,000 times magnification). The resulting TEM image is subject to EDS analysis to determine distribution images of the Fe element, Cr element, Si element, Zr element, Al element or Ti element. These distribution images are analyzed. The region observed by the TEM is determined such that it can include the oxide films 32 formed on the surface of the metal magnetic particles.

The fine particles 41 adhere to the surface of the metal magnetic particles 31. The fine particles 41 adhere to the surface of each of the metal magnetic particles 31 contained in the base body 10. The fine particles 41 adhering to the surface of each of the metal magnetic particles 31 are separated from each other. In other words, the fine particles 41 do not clump together on part of the surface of each of the metal magnetic particles 31. For example, approximately 100 to 1,000 fine particles 41 adhere to the surface of each of the metal magnetic particles 31. The fine particles 41 adhering to the surface of each of the metal magnetic particles 31 are at least partially covered by the oxide film 32 formed on the surface of the metal magnetic particle 31.

The fine particles 41 are insulating and non-magnetic particles. The fine particles 41 are obtained by mixing the source fine-particle powder with the soft magnetic metal powder, which is the source material for the metal magnetic particles 31, and thermally treating the powder mixture. As described above, the thermal treatment oxidizes the soft magnetic metal powder, so that the metal magnetic particles 31 having the oxide films 32 formed on their surface can be obtained. Note that the fine-particle powder is composed of an inorganic material that remains stable under thermal treatment performed at a temperature of approximately 900° C., which is likely to be applied by thermal treatment conducted during the process of manufacturing electronic components. The fine-particle powder is, for example, an $SiO_2$, $Al_2O_3$, $Cr_2O_3$, or $Ti_2O_3$ powder. The $SiO_2$, $Al_2O_3$, $Cr_2O_3$, or $Ti_2O_3$ powder does not melt and can preserve a stable shape under heating to temperatures near 900° C.

The fine particles 41 may be hydrophobically treated. The fine particles 41 may be, for example, hydrophobically treated $SiO_2$ particles. The hydrophobically treated fine particles 41 are less likely to agglomerate during the manufacturing process of the base body 10, so that they can dispersively adhere to the surface of the metal magnetic particles 31. Since the used fine particles 41 are less likely to clump together, the content ratio of the fine particles 41 in the base body 10 can be low. Since the fine particles 41 are non-magnetic, a low content ratio of the fine particles 41 in the base body 10 can result in improved magnetic permeability of the base body 10.

The fine particles 41 adhering to the surface of the metal magnetic particles 31 are each separated from adjacent ones of the fine particles 41 on the surface of the metal magnetic particles 31. The distance between adjacent ones of the fine particles 41 may be greater than the average particle size of the fine particles 41. Since the fine particles 41 are sparsely distributed on the surface of the metal magnetic particles 31, the ratio of the area of the metal magnetic particles 31 covered with the fine particles 41 (the covered area) to the surface area of the metal magnetic particles 31 (the coverage) can be ⅓, for example. A coverage of ⅓ or less can facilitate the oxidation of the metal magnetic particles 31 while the soft magnetic metal powder is heated. In addition, as the coverage is ⅓ or less, the fine particles 41 are prevented from occupying an excessively large part of the base body 10. This can reduce a drop in magnetic permeability of the base body 10, which is caused by an excessively high ratio of the fine particles 41.

If the fine particles 41 adhere to the surface of the particles of the soft magnetic metal powder, which is the source material of the metal magnetic particles 31, this can reduce the attraction acting between the particles of the soft magnetic metal powder (for example, the van der Waals force) while the resin composition containing the soft magnetic metal powder is molded. This can result in high flowability of the particles of the soft magnetic metal powder in the resin composition, so that the metal magnetic particles 31 can be more densely arranged in the base body 10 resulting from the molding and heating of the resin composition. As described above, the fine particles 41 adhering to the surface of the metal magnetic particles 31 can effectively improve the filling factor of the metal magnetic particles 31 in the base body 10.

The particle size of the fine particles 41 is less than that of the metal magnetic particles 31. The average particle size of the fine particles 41 is, for example, less than 1 μm. The average particle size of the fine particles 41 can be defined as the average particle size (median diameter (D50)) calculated from the volume-weighted particle size distribution. The average particle size of the fine particles 41 is 10 nm or more. As will be described below, the distance between adjacent ones of the metal magnetic particles 31 in the base body 10 is equal to the diameter of the fine particles 41. If the distance between adjacent ones of the metal magnetic particles 31 is less than 5 nm, the adjacent metal magnetic particles 31 cannot be reliably insulated from each other even if an insulation material is interposed between them. Since the fine particles 41 have a particle size of 10 nm or more, most of the fine particles 41 adhering to the surface of the metal magnetic particles 31 can have a diameter of 5 nm or more. The fine particles 41 may be separated from the source material powder using the known nanoparticle classification techniques under such a condition that the lower limit of particle size is 10 nm. The metal magnetic particles 31 can be reliably electrically insulated from each other since the insulating fine particles 41, which have an average particle size of 10 nm or at least have a particle size of 10 nm, are interposed between adjacent ones of the metal magnetic particles 31.

If the fine particles 41 have an excessively large particle size, the fine particles 41 occupy a large volume in the base body 10 and the metal magnetic particles 31 are separated from each other at large intervals. This may lower the filling factor of the metal magnetic particles 31 in the base body 10 and resultantly lowers the magnetic permeability of the base body 10. For this reason, an upper limit may be placed on the average particle size of the fine particles 41. For example, the average particle size of the fine particles 41 may be 1/10 or less of the average particle size of the metal magnetic particles 31. For example, the upper limit of the average particle size of the fine particles 41 can be determined in the following manner. Firstly, a magnetic base body is manufactured that contains the metal magnetic particles 31 but not the fine particles 41, and the magnetic permeability of the magnetic base body is measured. Secondly, the metal magnetic particles 31 and a plurality of types of fine particles 41 are prepared. The plurality of types of fine particles 41 all have an average particle size of 10 nm or more but have different average particles sizes. For example, the average particle sizes of the fine particles 41 are respectively 10 nm, 30 nm, 80 nm, 110 nm, and 170 nm. Among the types of fine particles 41 prepared, the fine particles 41 having the smallest average particle size (in this example, the fine particles 41 having an average particle size of 10 nm) are used and a base body 10 is manufactured that contains a predetermined ratio of the fine particles 41 of the smallest average particle size. The magnetic permeability of the base body 10 is measured. The content of the fine particles 41 in the base body 10 is, for example, 1.0 wt %. If the magnetic permeability of the base body 10 that is thus manufactured and contains the fine particles 41 is equal to or greater than the magnetic permeability of the magnetic base body containing no fine particles 41, the average particle size of the fine particles 41 contained in this base body 10 is determined to be equal to or less than the upper limit. Subsequently, another base body 10 is manufactured with fine particles 41 having a larger average particle size (for example, fine particles 41 having an average particle size of 30 nm), and the magnetic permeability of this base body 10 is measured. If the magnetic permeability of the base body 10 is below the magnetic permeability of the magnetic base body with no fine particles 41, the average particle size of the fine particles 41 can be determined to exceed the upper limit. According to the above example, for instance, the upper limit of the average particle size of the fine particles 41 can be determined to be 110 nm if the magnetic permeability of the base body 10 containing the fine particles 41 with an average particle size of 110 nm is equal to or above the magnetic permeability of the magnetic base body without the fine particles 41 and the magnetic permeability of the base body 10 containing the fine particles 41 having an average particle size of 170 nm is below the magnetic permeability of the magnetic base body containing no fine particles 41. If the average particle size of the metal magnetic particles 31 is 1 μm to 50 μm, the upper limit of the average particle size of the fine particles 41 can be, for example, 30 nm to 110 nm.

The following now further describes the bonding between adjacent ones of the metal magnetic particles 31 mainly with reference to FIGS. 5 and 6. FIG. 5 shows a first metal magnetic particle **31*a* and a second metal magnetic particle 31*b* of the metal magnetic particles 31 contained in the base body 10, and a first fine particle 41*a* of the fine particles 41 contained in the base body 10. For the sake of brevity, FIG. 5 only shows the first fine particle 41*a* of the fine particles 41, but a large number of fine particles 41 adhere to the surface of the first and second metal magnetic particle 31*a* and 31*b* in addition to the first fine particle 41*a***.

As shown in the drawings, the first metal magnetic particle **31*a* is adjacent to the second metal magnetic particles 31*b* in the base body 10. Between the first metal magnetic particle 31*a* and the second metal magnetic particle 31*b*, the first fine particle 41*a* is interposed. The first fine particle 41*a* is in contact with both of the first and second metal magnetic particles 31*a* and 31*b*. Therefore, the distance between the first metal magnetic particle 31*a* and the second metal magnetic particle 31*b* is equal to the diameter of the first fine particle 41*a***.

The surface of the first metal magnetic particle **31*a* is, except for where the first metal magnetic particle 31*a* touches the first fine particle 41*a*, covered with a first oxide film 32*a*. The surface of the second metal magnetic particle 31*b* is, except for where the second metal magnetic particle 31*a* touches the first fine particle 41*a*, covered with a second oxide film 32*b*. The first and second oxide films 32*a* and 32*b* are both examples of the oxide film 32. The first oxide film 32*a* is in contact with the second oxide film 32*b*. The first oxide film 32*a* is bonded to the second oxide film 32*b*. The first and second metal magnetic particles 31*a* and 31*b* are bonded to each other via the first and second oxide films 32*a* and 32*b*. The first and second metal magnetic particles 31*a* and 31*b* are bonded to each other via a bonding portion constituted by a portion of the first oxide film 32*a* and a portion of the second oxide film 32*b*. The first fine particle 41*a*** is positioned within the bonding portion.

As shown in FIG. 6, the first fine particle **41*a* is in contact with the surface of the first metal magnetic particle 31*a* and the surface of the second metal magnetic particle 31*b*. The surface of the first fine particle 41*a* is covered with the first and second oxide films 32*a* and 32*b*, except for its contact point (or contact surface) with the first metal magnetic particle 31*a* and its contact point (or contact surface) with the second metal magnetic particle 31*b*. When the section of the base body 10 is observed in a SEM image, the boundary between the first oxide film 32*a* and the second oxide film 32*b*** may not be clearly visible.

FIGS. 5 and 6 show the first and second metal magnetic particles **31*a* and 31*b* of the metal magnetic particles 31** contained in the base body 10, but the description made with reference to FIGS. 5 and 6 are applicable to any adjacent ones of the metal magnetic particles 31 contained in the base body 10, other than the first and second metal magnetic particles 31*a* and 31*b*. In other words, the fine particles 41 are interposed between adjacent ones of the metal magnetic particles 31 contained in the base body 10, and the distance between the adjacent metal magnetic particles 31 is equal to the diameter of the fine particles 41 interposed between them.

As the sharpness of the particle size distribution of the fine particles 41 increases, the distance between adjacent ones of the metal magnetic particles 31 can be more uniform. Commercially available fine particles can be used as the fine particles 41 with a sharp particle size distribution. The spherical-silica fine particles available from Shin-Etsu Chemical Co. under the model name of the QSG series are an example of the commercially available fine particles that can be used as the fine particles 41. If the commercially available fine particles are classified, the fine particles 41 can achieve a sharper particle size distribution. In one embodiment, the coefficient of variation is 0.6 or less for the particle size of the fine particles 41.

Figure 7:
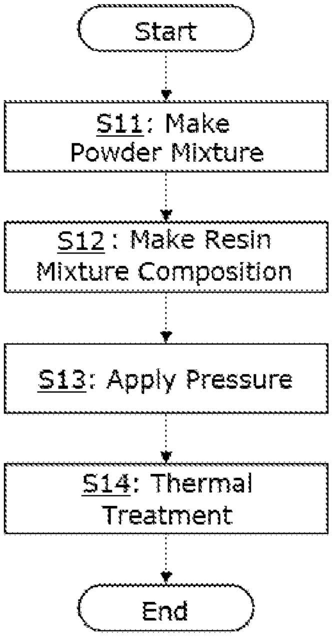
FIG. 7 is a flowchart showing a method of manufacturing a magnetic composite body according to one embodiment of the present invention.
Figure 8:
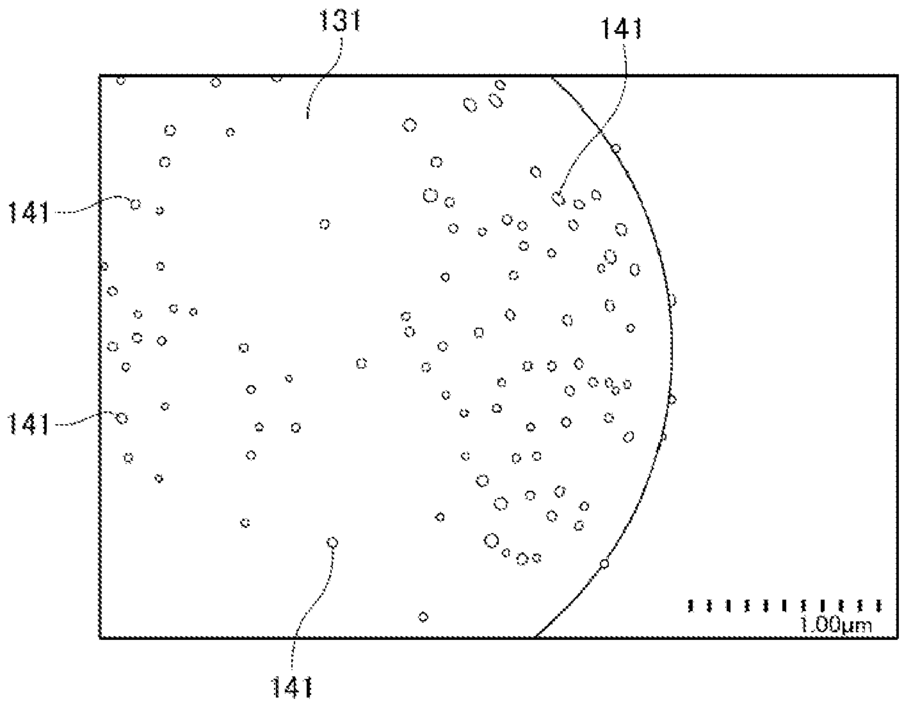
FIG. 8 schematically shows metal magnetic particles having fine particles adhering to their surface.
Figure 9:
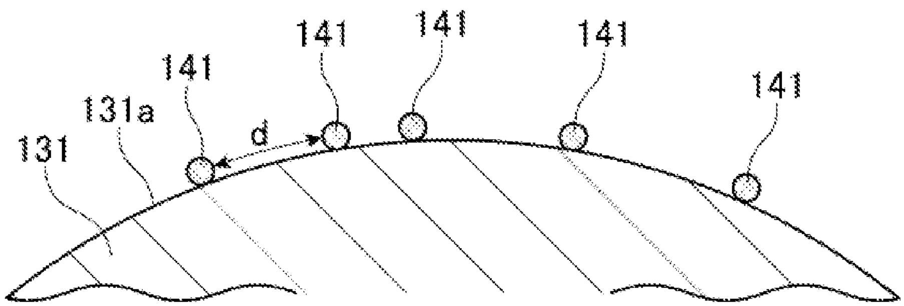
FIG. 9 is a schematic view illustrating fine particles adhering to the surface of metal magnetic particles.

The following now describes an example method of manufacturing the coil component 1 including the magnetic composite body 10 according to one embodiment of the invention with reference to FIGS. 7 to 9. In the first step S11, the soft magnetic metal powder, which is the source material for the metal magnetic particles 31, and the fine-particle powder, which is the source material for the fine particles 41, are prepared. The soft magnetic metal powder and fine-particle powder are mixed together to obtain a powder mixture. The soft magnetic metal powder and fine-particle powder are mixed together using, for example, a planetary mixer. In the powder mixture, the particles of the fine-particle powder adhere to the surface of the particles of the soft magnetic metal powder. The fine-particle powder is added at a ratio of 0.1 to 1.0 wt % to the soft magnetic metal powder 100 wt %. The fine-particle powder may be hydrophobically treated.

The inventors of the present invention observed the particles of the fine-particle powder adhering to the surface of the particles of the soft magnetic metal powders, in the following manner. First, a soft magnetic metal powder of an Fe—Si—Cr alloy and a fine-particle powder having an average particle size of 30 nm (QSG-30 available from Shin-Etsu Chemical Co.) were mixed together using a planetary mixer, to produce a powder mixture where the particles of the fine-particle powder adhere to the surface of the particles of the soft magnetic metal powder. The powder mixture was photographed using a scanning electron microscope (SEM) at a magnification of 30000×, so that an SEM image was obtained. The SEM image shown in FIG. 8 is obtained in this manner. The SEM image (FIG. 8) can reveal that a large number of particles of the fine-particle powder 141 adhere to the surface of the particles of the soft magnetic metal powder 131 contained in the powder mixture. As shown in the SEM image shown in FIG. 8, the particles of the fine-particle powder 141, which adhere to the surface of the particles of the soft magnetic metal powder 131, do not agglomerate but are separated from each other. As shown in FIG. 9, on a surface 131*a* of a particle of the soft magnetic metal powder 131, a distanced between adjacent particles of the fine-particle powder 141 was greater than the diameter of either one of the particles of the fine-particle powder 141.

In the subsequent step S12, the powder mixture obtained in the step S11 is mixed and kneaded with a resin and a solvent, to produce a resin mixture composition. The resin may be an epoxy resin, an acrylic resin, a polyvinyl butyral (PVB) resin, or any other known resins.

Figure 10:
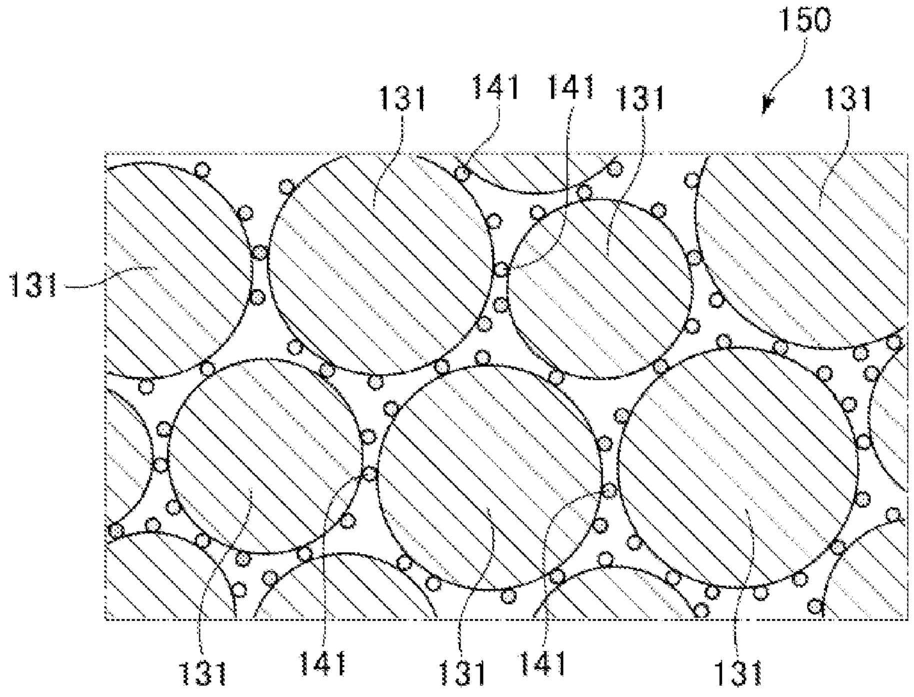
FIG. 10 schematically shows the section of a compression-molded body obtained during the process of manufacturing a magnetic composite body.

In the next step S13, the resin mixture composition produced in the step S12 is molded into a predetermined shape to produce a molded body. Pressure is then applied to the molded body, so that a compressed molded body is obtained. The molded body can be obtained by, for example, applying, in the form of a sheet, the resin mixture composition onto a base member such as a PET film and drying the resin mixture composition to allow the solvent to volatilize. In this manner, the obtained molded body contains a plurality of particles of the soft magnetic metal powder dispersed in the resin. The particles of the fine-particle powder adhere to the surface of the particles of the soft magnetic metal powder. The thus manufactured molded body is placed in a mold, to which pressure is applied. As a result, the compressed molded body is obtained. The molding pressure is, for example, 10 to 100 Mpa. Since the particles of the fine-particle powder adhere to the surface of the particles of the soft magnetic metal powder, the distance left between the particles of the soft magnetic metal powder in the molded body can remain equal to or greater than the diameter of the particles of the fine-particle powder during the application of the pressure. When the molded body is compressed that contains the particles of the soft magnetic metal powder having the particles of the fine-particle powder adhering to the surface thereof, the attraction acting between the particles of the soft magnetic metal powder (for example, the van der Waals force) can be lower than when a molded body is compressed that contains particles of a soft magnetic metal powder having no particles of a fine-particle powder adhering thereto. FIG. 10 shows a schematic enlarged sectional view showing a section of a compressed molded body 150 obtained in the above-described manner. As mentioned above, the particles of the soft magnetic metal powder are highly flowable while a pressure is applied. Accordingly, as shown in FIG. 10, adjacent particles of the soft magnetic metal powder 131 are densely arranged in the compressed molded body 150 since the particles of the soft magnetic metal powder flow while a pressure is applied. Since a large number of particles of the fine-particle powder 141 adhere to the surface of the particles of the soft magnetic metal powder 131, the distance between adjacent particles of the soft magnetic metal powder 131 in the compressed molded body 150 is equal to the diameter of the particles of the fine-particle powder 141. When some particles of the fine-particle powder 141 adhere to the surface of one particle of the soft magnetic metal powder 131 before a pressure is applied, compressing the molded body results in these particles of the fine-particle powder 141 coming into contact with the surface of adjacent particles of the soft magnetic metal powder 131. For example, when some particles of the fine-particle powder 141 adhere to the surface of a certain particle of the soft magnetic metal powder 131 before a pressure is applied, the distance between adjacent particles of the soft magnetic metal powder 131 is equal to the size of one particle of the fine-particle powder 141 on completion of the application of the pressure since the application of the pressure causes the certain particle of the soft magnetic metal powder 131 to approach other particles of the soft magnetic metal powder 131. Accordingly, in the compressed molded body, the particles of the fine-particle powder 141 are interposed between adjacent particles of the soft magnetic metal powder 131. The particles of the fine-particle powder 141 are in contact with both of the adjacent particles of the soft magnetic metal powder 131.

In the following step S14, the compressed molded body fabricated in the step S131 is heated to be degreased, and the degreased compressed molded body is subject to thermal treatment. The thermal treatment is performed at a temperature of 600° C. to 900° C. for a duration of 20 to 120 minutes, for example. As a result, a composite magnetic body is completed. This thermal treatment processes the particles of the soft magnetic metal powder into the metal magnetic particles 31 with the oxide films 32 formed on their surface, and also processes the particles of the fine-particle powder into the fine particles 41. The metal magnetic particles 31 are bonded to their adjacent ones via the oxide films 32. The fine-particle powder is a powder of an oxide that can remain stable under thermal treatment (for example, $SiO_2$, $Al_2O_3$, $Cr_2O_3$ or $Ti_2O_3$ powder), and the shape of the particles of the fine-particle powder experiences no or little change through the thermal treatment in the step S14. Both the degreasing and the forming of the oxide films 32 may be performed in a single session of thermal treatment. The thermal treatment for the degreasing may be separately performed from the thermal treatment for the forming of the oxide films 32. The thermal treatment may be thus performed in two separate stages.

In the above-described manner, the soft magnetic metal powder and fine-particle powder are processed into magnetic composite bodies. In the resulting composite magnetic bodies fabricated in the above-described manner, the fine particles 41 are in contact with both of their adjacent ones of the metal magnetic particles 31, so that the distance between the adjacent metal magnetic particles 31 can be uniformly equal to the diameter of the fine particles 41.

Figure 11A:
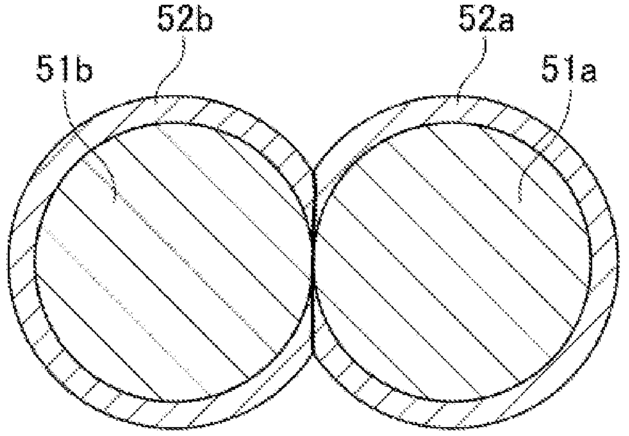
Fig. 11A (Related Art)
FIG. 11A is a schematic view illustrating how metal magnetic particles are bonded to each other in the conventional art.
Figure 11B:
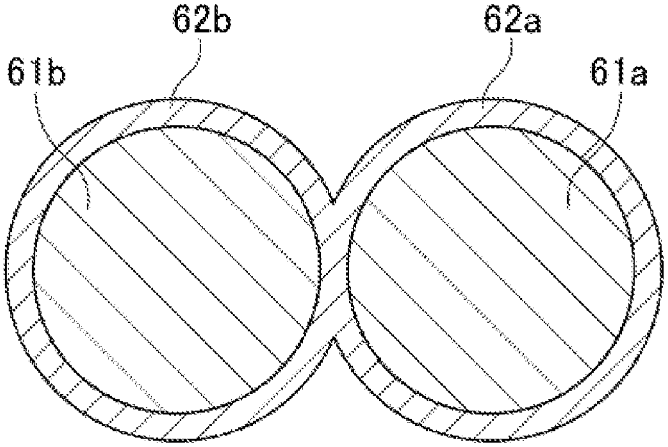
Fig. 11B (Related Art)
FIG. 11B is a schematic view illustrating how metal magnetic particles are bonded to each other in the conventional art.

The following now describes the differences between the base body 10 relating to one embodiment (composite magnetic body) and a conventional magnetic base body with further reference to FIGS. 11A and 11B. FIGS. 11A and 11B are schematic views for illustrating how metal magnetic particles are bonded to each other in conventional magnetic base bodies. FIG. 11A shows metal magnetic particles 51*a* and Sib adjacent to each other in a region within a conventional magnetic base body that contains no insulating fine particles, and FIG. 11B shows metal magnetic particles 61*a* and 61*b* adjacent to each other in another region within the same magnetic base body. As shown in FIG. 11A, in the conventional magnetic base body containing no insulating fine particles, the metal magnetic particles 51*a* and Sib may be too close since no fine particles are interposed between the metal magnetic particles 51*a* and Sib. If the distance between the metal magnetic particles 51*a* and Sib is 10 nm or less, especially 5 nm or less, electrical insulation cannot be reliably established between the metal magnetic particles 51*a* and Sib. In another region in the same magnetic base body, on the other hand, a large distance may be left between the adjacent metal magnetic particles 61*a* and 61*b* as shown in FIG. 11B. In the conventional magnetic base body containing no insulating fine particles, the distance between adjacent ones of the metal magnetic particles may be small in some regions but large in other regions. This means that the distance between adjacent ones of the metal magnetic particles significantly vary among regions in the conventional magnetic base body containing no insulating fine particles. For this reason, local magnetic saturation is likely to occur in magnetic paths through regions where only a small distance is left between adjacent ones of the metal magnetic particles (e.g., the region shown in FIG. 11A). Therefore, the conventional magnetic base body cannot achieve high rated current.

In the base body 10 according to one embodiment of the invention, on the other hand, the distance between any adjacent ones of the metal magnetic particles 31 can be equal to the diameter of the fine particles 41 as shown in FIG. 4. As a result, the variation in distance between adjacent ones of the metal magnetic particles 31 can be less than in the conventional art. Accordingly, the coil component 1 using the base body 10 relating to one embodiment of the present invention can achieve high rated current. As a consequence, the base body 10 can accomplish improved magnetic saturation characteristics.

In the base body 10 according to one embodiment of the invention, the first oxide film 32*a* on the surface of the first metal magnetic particle 31*a* is in contact with the second oxide film 32*b* on the surface of the second metal magnetic particle 31*b* as shown in FIG. 5. Therefore, the first and second metal magnetic particles 31*a* and 31*b* are bonded to each other via the first and second oxide films 32*a* and 32*b*. Since the first and second oxide films 32*a* and 32*b* contain a ferromagnetic material (e.g., magnetite), the base body 10 can achieve higher magnetic permeability than magnetic composite bodies in which adjacent ones of the metal magnetic particles are bonded to each other via non-magnetic coating films or binding agents.

Since the fine particles 41 are made from the source fine-particle powder having a sharp particle size distribution, the variation in particle size of the fine particles 41 in the base body 10 can be low. In this way, the base body 10 can accomplish further improved magnetic saturation characteristics.

Next, the method of manufacturing the coil component 1 will be described. The coil component 1 may be manufactured by, for example, the sheet laminating technique. The following describes an example method of manufacturing the coil component 1 using the sheet laminating technique.

To begin with, magnetic sheets are fabricated to be used as precursors of the respective magnetic films constituting the base body 10 (the magnetic films 18*a* to 18*d* making up the top cover layer 18, the magnetic films 11 to 17 making up the magnetic layer 20, and the magnetic films 19*a* to 19*d* making up the bottom cover layer 19). The magnetic sheets are produced in the steps S11 to S13 illustrated in FIG. 7, for example. Specifically, a soft magnetic metal powder, which is the source material for the metal magnetic particles 31, and a fine-particle powder, which is the source material for the fine particles 41, are mixed to produce a particle mixture. The particle mixture is mixed and kneaded with a resin and a solvent to produce a resin mixture composition. The resin mixture composition is applied onto the surface of a plastic base film by the doctor blade method or other common methods and dried to obtain a sheet-shaped molded body. A molding pressure of approximately 10 Mpa to 100 Mpa is applied to the sheet-shaped molded body in the mold, so that a magnetic sheet is obtained.

After this, a through-hole is formed in the respective magnetic sheets, which are precursors of the magnetic films 11 to 16, at a predetermined position so as to extend through the sheets in the T-axis direction. Following this, a conductive paste is printed by screen printing on the top surface of each of the magnetic sheets, which are to be formed into the magnetic films 11 to 17, so that a conductor pattern is formed on each of the magnetic sheets and the through-hole formed in each of the magnetic sheets is filled with the conductive paste. The conductor patterns formed on the magnetic sheets in the above manner, which are precursors of the magnetic films 11 to 17, are heated to be processed respectively into the conductor patterns C11 to C17, and the metal filling the through-holes are also heated to be formed into the vias V1 to V6. The conductor patterns can be formed by any various known methods instead of the screen printing.

Next, the magnetic sheets, which are precursors of the magnetic films 11 to 17, are stacked to obtain a coil laminated body. The magnetic sheets, which are precursors the magnetic films 11 to 17, are stacked such that the conductor patterns C11 to C17 formed on the respective magnetic sheets are each electrically connected to the adjacent conductor patterns through the vias V1 to V6.

Following this, a plurality of magnetic sheets are stacked to form a top laminated body, which is to be formed into the top cover layer 18. Similarly, a plurality of magnetic sheets are stacked to form a bottom laminated body, which is to be formed into the bottom cover layer 19.

Next, the bottom laminated body, the coil laminated body, and the top laminated body are stacked in the stated order in the direction of the T axis from the negative side to the positive side, and these stacked laminated bodies are bonded together by thermal compression using a pressing machine to make a main laminated body. Instead of forming the bottom, coil and top laminated bodies, the main laminated body may be made by sequentially stacking all of the magnetic sheets prepared in advance and bonding the stacked magnetic sheets collectively by thermal compression. Then, the main laminated body is diced to a desired size by using a cutter such as a dicing machine or a laser processing machine to make a chip laminated body. Polishing treatment such as barrel polishing may be performed on the end portions of the chip laminated body, if necessary.

Next, the chip laminated body is degreased and then subjected to thermal treatment, so that the base body 10 is obtained. The thermal treatment forms the oxide films 32 on the surface of the metal magnetic particles, so that adjacent ones of the metal magnetic particles 31 are bonded to each other via the oxide films 32. The thermal treatment also forms an oxide film on the surface of the base body 10. The chip laminated body is thermally treated at a temperature of 600° C. to 900° C. for a duration of 20 to 120 minutes.

Next, a conductive paste is applied to both end portions of the chip laminated body to form the external electrodes 21 and 22. At least one of a solder barrier layer or a solder wetting layer may be formed on the external electrodes 21 and 22 as necessary. By the above-described process, the coil component 1 can be obtained.

It is also possible to produce the coil component 1 by the compression molding, thin film processing, slurry build or any other known methods.

EXAMPLES

Five different types of magnetic composite bodies different from each other in terms of the average particle size of the fine particles 41 were prepared as follows, and their magnetic properties were evaluated. First, as the source material for the metal magnetic particles 31, a soft magnetic metal powder with an average particle size of 4 μm (Fe: 95 wt %, Si: 3.5 wt %, and Cr: 1.5 wt %) was prepared. As the source material for the fine particles 41, silica fine particles with an average particle size of 10 nm (QSG series available from Shin-Etsu Chemical Co.) were prepared. Next, the fine-particle powder was added to the soft magnetic metal powder of 100 wt % at a ratio of 0.2 wt %. The soft magnetic metal powder and fine-particle powder were then both fed to a planetary mixer to make a powder mixture. The mixing of the soft magnetic metal powder and the fine-particle powder was done such that the particles of the fine-particle powder adhered to the surface of each of the particles of the soft magnetic metal powder.

The powder mixture was mixed and kneaded with an acrylic resin and a solvent to make a resin mixture composition. The resin mixture composition was applied onto a PET film using the doctor blade method, and dried to cause the solvent to volatilize. In this manner, a sheet-shaped resin molded body was obtained. A plurality of sheet-shaped resin molded bodies were stacked on each other, to obtain a laminate with a thickness of 4.5 mm. Subsequently, the laminate was pressed in two steps at a pressure of 10 $t/cm^2$, so that the sheet-shaped resin molded bodies were bonded to each other. The laminate was then punched into a toroidal shape with an outer diameter of 19 mm and an inner diameter of 10 mm. The toroidal-shaped laminate was then degreased at a temperature of 350° C. in air. The degreased laminate was then thermally treated at a temperature of 800° C. for a duration of 60 minutes in air. The thermal treatment could produce a magnetic composite body, which is referred to as a sample 1. The thermal treatment processed the particles of the soft magnetic metal powder into the metal magnetic particles 31 with the oxide films 32 formed on their surface, and also processed the particles of the fine-particle powder into the fine particles 41.

Samples 2 to 5 were also prepared using fine-particle powders with different average particle sizes. Specifically, four fine-particle powders with average particle sizes of 30 nm, 80 nm, 110 nm, and 170 nm (the QSG series available from Shin-Etsu Chemical Co.) were prepared and used as the source material for the fine particles 41. Magnetic composite bodies serving as Samples 2 to 5 were manufactured in the same way as the magnetic composite body serving as Sample 1.

In place of the fine-particle powder, a carboxyl group-containing modified polymer was added to the soft magnetic metal powder as an organic dispersant. A magnetic composite body was fabricated in the same manner as Sample 1. The magnetic composite body prepared with the organic dispersant is referred to as Sample 6.

Furthermore, a soft magnetic metal powder that was mixed with neither a fine-particle powder nor an organic dispersant was mixed and kneaded with an acrylic resin and a solvent to produce a resin composition, and the resin composition was degreased and thermally treated under the same conditions as Samples 1 to 6. In this manner, a magnetic body serving as Sample 7 was produced.

The filling factor of the metal magnetic particles 31 was measured for each of Samples 1 to 7 fabricated as described above. Specifically, the filling factor was calculated in the following manner. Each sample was cut along the thickness direction to expose a section, and the ratio of the area occupied by the metal magnetic particles to the total area of the section in the view field is defined as the filling factor.

Furthermore, the magnetic permeability at a frequency of 100 kHz was measured for Samples 1 to 7 using an impedance analyzer E4991A available from Agilent.

For Samples 1 to 7, the saturation current value (Isat) was measured. The saturation current value indicates the value of the DC current observed when the inductance of the inductor drops 30% from an initial value of the inductance as a result of DC current applied to the inductor. The initial value of the inductance is the value measured when no DC current is applied to the inductor.

Samples 1 to 7 were evaluated in terms of withstand voltage characteristics as follows. This was done by forming electrodes on two opposing surfaces of Samples 1 to 7, applying a voltage between these electrodes, and measuring the current value. The applied voltage was raised gradually while measuring the electric current value, and when the electric current density calculated from the electric current value is 0.01 A/cm$^2$, the electric field strength calculated from the voltage being applied was determined as the breakdown voltage (BDV).

The filling factor, magnetic permeability, saturation current value, and breakdown voltage measured in the above-described manner are all shown in Table 1.

TABLE 1

| | Additive | | | | | |
|---|---|---|---|---|---|---|
| | Type | Average Particle Size (nm) | Filling Factor vol % | Magnetic Permeability — | Isat kA/m | BDV V/um |
| Sample 1 (Example) | Silica Fine Particles | 10 | 86.8 | 52.10 | 10.5 | 0.3 |
| Sample 2 (Example) | Silica Fine Particles | 30 | 87.0 | 52.26 | 11.1 | 0.6 |
| Sample 3 (Example) | Silica Fine Particles | 80 | 87.3 | 52.34 | 11.7 | 0.8 |
| Sample 4 (Example) | Silica Fine Particles | 110 | 87.2 | 52.31 | 11.9 | 0.8 |
| Sample 5 (Example) | Silica Fine Particles | 170 | 86.4 | 51.80 | 12.9 | 1.1 |
| Sample 6 (Comparative Example) | Organic Dispersant | — | 87.3 | 52.42 | 8.4 | 0.1 |
| Sample 7 (Comparative Example) | (None) | — | 86.6 | 52.00 | 10.5 | 0.3 |

The measurements shown as above confirmed that the saturation current value was better in Samples 1 to 5 than in Sample 6, which contained no fine particles 41. In addition, it was confirmed that a breakdown voltage of 0.3 V/μm or higher could be achieved in Samples 1 to 5. Furthermore, the measurements could demonstrate that the filling factor was better in Samples 1 to 4, which were magnetic composite bodies containing the fine particles 41, than in Sample 7, which contains no fine particles, as a result of which Samples 1 to 4 could achieve improved magnetic permeability. Since the fine particles 41 have a large average particle size in Sample 5, this can accordingly explain the low filling factor of the metal magnetic particles 31 in Sample 5. This may indicate that the magnetic permeability can be improved by including the fine particles 41 with an average particle size of 110 nm or less.

Sample 6, which uses an organic dispersant, achieves improved filling factor and magnetic permeability, but suffers from low saturation current value. Since the variation in distance between adjacent ones of the metal magnetic particles is high in Sample 6, local magnetic saturation is likely to occur in regions where only a short distance is left between the metal magnetic particles. This is deemed to be attributable to the low saturation current value.

Sample 6 exhibits significantly reduced breakdown voltage. In Sample 6, an organic dispersant is added to the soft magnetic metal powder. The residue of the organic dispersant (carbon) consumes oxygen in the atmosphere during the thermal treatment, which may hinder generation of an oxide film (in particular, iron oxide) on the surface of the metal magnetic particles. Dielectric breakdown is thus likely to occur between adjacent ones of the metal magnetic particles. When silica fine particles are used as the fine-particle powder, the thermal treatment does not produce byproducts that are to consume oxygen. Therefore, the generation of the oxide films 32 on the surface of the metal magnetic particles 31 is not hindered. Therefore, the use of the silica fine particles can result in improving the breakdown voltage.

In addition, the sheet-shaped resin molded bodies produced during the process of manufacturing Samples 2 and 7 were evaluated for their elongation properties as follows. The sheet-shaped resin molded body obtained during the process of making Sample 2 was cut to a size of 3 cm×9 cm, so that a strip of 3 cm wide and 9 cm long (Sample B1) was obtained. Similarly, the sheet-shaped resin molded body obtained during the process of making Sample 7 was cut to a size of 3 cm×9 cm, so that a strip of 3 cm wide and 9 cm long (Sample 2) was obtained. These test strips (Samples B1 and B2) were subjected to a tensile test in accordance with JIS K 7127 under the following conditions, and elongation at break was observed.

Tension speed: 30 mm/min
Temperature: 25° C.
Inter-Chuck distance: 50 mm

The density was also measured for these test strips. The measurements of the elongation at break and density were shown in the following Table 2.

TABLE 2

| | Additive | Density g/cm3 | Thickness um | Elongation at Break % |
|---|---|---|---|---|
| Sample B1 (Example) | Silica Fine Particles (Average Particle Size 30 nm) | 4.03 | 50 | 5.0 |
| Sample B2 (Comparative Example) | None | 3.72 | 50 | 1.1 |

The above measurements proved that the density in the sheet of Sample B1, which contained the fine-particle powder (silica fine particles), was higher than that in the sheet of Sample B2, which contained no fine-particle powder. This improvement in density is deemed to be attributable to the fact that the fine-particle powder can improve the flowability and dispersibility of the soft magnetic metal powder in the resin mixture composition.

Since the sheet of Sample B1 exhibits improved density, the elongation at break is higher for Sample B1 than for Sample B2. Therefore, the sheet of Sample B1 can be better handled. For example, the sheet of Sample B1 is easily detached from the base film. In addition, the shape of the sheet of Sample B1 is unlikely to be deformed when the sheet is detached from the base film, the conductive paste can be accurately printed on the sheet.

One or more of the steps of the manufacturing method described herein can be omitted as appropriate. In the manufacturing method of the coil component 1, steps not described explicitly in this specification may be performed as necessary. A part of the steps included in the manufacturing method of the coil component 1 may be performed in different order within the purport of the present invention. A part of the steps included in the manufacturing method of the coil component 1 may be performed at the same time or in parallel, if possible.

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

This specification also discloses the following embodiments.

[1]

A magnetic composite body including:

a plurality of metal magnetic particles including a first metal magnetic particle and a second metal magnetic particle adjacent to the first metal magnetic particle;

first fine particles in contact with the first and second metal magnetic particles, the first fine particles being insulating and non-magnetic;

an insulating first oxide film on a surface of the first metal magnetic particle, the first oxide film containing an oxide of an element constituting the first metal magnetic particle; and an insulating second oxide film on a surface of the second metal magnetic particle, the second oxide film containing an oxide of an element constituting the second metal magnetic particle.

[2]

The magnetic composite body of [1], wherein the first oxide film is bonded to the second oxide film.

[3]

The magnetic composite body of [1] or [2], wherein the first fine particles are covered with the first and second oxide films.

[4]

The magnetic composite body of any one of [1] to [3], wherein an average particle size of the first fine particles is from 10 nm to 110 nm.

[5]

The magnetic composite body of any one of [1] to [4], including a plurality of fine particles on a surface of the first metal magnetic particles, the fine particles being separated from each other, wherein the fine particles are insulating and non-magnetic, wherein at least a portion of each of the fine particles is covered with the first oxide film, and wherein the fine particles include the first fine particles.

[6]

The magnetic composite body of any one of [1] to [5], wherein the fine particles include second fine particles adjacent to the first fine particles, and wherein a distance between the first fine particles and the second fine particles is greater than a particle size of the first fine particles and also than a particle size of the second fine particles.

[7]

The magnetic composite body of any one of [1] to [6], wherein each of the fine particles is a hydrophobically treated $SiO_2$ particle.

[8]

The magnetic composite body of any one of [1] to [7], wherein each of the metal magnetic particles is a Fe-based metal magnetic particle.

[9]

A coil component including:

the magnetic composite body of any one of [1] to [8]; and a coil conductor provided in the magnetic composite body.

[10]

A circuit board including the coil component of [9].

[11]

An electronic device including the circuit board of [10].

[12]

A method of manufacturing a magnetic composite body, including steps of:

mixing a soft magnetic metal powder and an insulating and non-magnetic fine-particle powder, so that a powder mixture is obtained;

mixing the powder mixture with a resin, so that a resin mixture composition is obtained;

compressing the resin mixture composition, so that a compressed molded body is obtained, at least one of particles of the fine-particle powder being arranged between adjacent particles of the soft magnetic metal powder; and heating the compressed molded body, so that the resin is degreased and an oxide film is formed on a surface of each particle of the soft magnetic metal powder.

[13]

The method of [12], wherein one or more particles of the fine-particle powder adhere to a surface of each particle of the soft magnetic metal powder contained in the powder mixture.

[14]

The method of [12] or [13], wherein the heating bonds oxide films formed on surfaces of adjacent particles of the soft magnetic metal powder.

[15]

The method of [12] or [13], wherein each particle of the soft magnetic metal powder is a Fe-based soft magnetic metal powder particle.

What is claimed is:

1. A magnetic composite body comprising:

a plurality of metal magnetic particles including a first metal magnetic particle and a second metal magnetic particle adjacent to the first metal magnetic particle;

first fine particles in contact with the first and second metal magnetic particles, the first fine particles being insulating and non-magnetic;

an insulating first oxide film on a surface of the first metal magnetic particle, the first oxide film containing an oxide of an element constituting the first metal magnetic particle; and an insulating second oxide film on a surface of the second metal magnetic particle, the second oxide film containing an oxide of an element constituting the second metal magnetic particle, wherein the first fine particles are part of a plurality of fine particles provided on a surface of the first metal magnetic particles, the plurality of fine particles being separated from each other, wherein the plurality of fine particles is insulating and non-magnetic, wherein at least a portion of each of the plurality of fine particles is covered with the first oxide film, wherein the plurality of fine particles includes the first fine particles and second fine particles adjacent to the first fine particles, and wherein a distance between the first fine particles and the second fine particles is greater than the particle size of the first fine particles and also than the particle size of the second fine particles.

2. The magnetic composite body of claim 1, wherein the first oxide film is bonded to the second oxide film.

3. The magnetic composite body of claim 1, wherein at least one of the first fine particles is partially covered with the first and second oxide films.

4. The magnetic composite body of claim 1, wherein an average particle size of the first fine particles is from 10 nm to 110 nm.

5. The magnetic composite body of claim 1, wherein each of the metal magnetic particles is a Fe-based metal magnetic particle.

6. A coil component comprising:

the magnetic composite body of claim 1; and a coil conductor provided in the magnetic composite body.

7. A circuit board comprising the coil component of claim 6.

8. An electronic device comprising the circuit board of claim 7.

9. A magnetic composite body comprising:

a plurality of metal magnetic particles including a first metal magnetic particle and a second metal magnetic particle adjacent to the first metal magnetic particle;

first fine particles in contact with the first and second metal magnetic particles, the first fine particles being insulating and non-magnetic;

an insulating first oxide film on a surface of the first metal magnetic particle, the first oxide film containing an oxide of an element constituting the first metal magnetic particle; and an insulating second oxide film on a surface of the second metal magnetic particle, the second oxide film containing an oxide of an element constituting the second metal magnetic particle, wherein the first fine particles are part of a plurality of fine particles on a surface of the first metal magnetic particles, the fine particles being separated from each other, wherein the plurality of fine particles is insulating and non-magnetic, wherein at least a portion of each of the first fine particles is covered with the first oxide film, and wherein each of the fine particles is a hydrophobically treated $SiO_2$ particle.

10. The magnetic composite body of claim 9, wherein the first oxide film is bonded to the second oxide film.

11. The magnetic composite body of claim 9, wherein each of the fine particles are partially covered with the first and second oxide films.

12. The magnetic composite body of claim 9, wherein an average particle size of the fine particles is from 10 nm to 110 nm.

13. The magnetic composite body of claim 9, wherein each of the metal magnetic particles is a Fe-based metal magnetic particle.

14. A coil component comprising:

the magnetic composite body of claim 9; and a coil conductor provided in the magnetic composite body.

15. A circuit board comprising the coil component of claim 14.

16. An electronic device comprising the circuit board of claim 15.

* * * * *